(12) United States Patent
Varela

(10) Patent No.: US 6,500,022 B2
(45) Date of Patent: Dec. 31, 2002

(54) THREADED PIN FOR CARBON ELECTRODES

(75) Inventor: William Varela, Parma Heights, OH (US)

(73) Assignee: UCAR Carbon Company Inc., Wilmington, DE (US)

(*) Notice: Subject to any disclaimer, the term of this patent is extended or adjusted under 35 U.S.C. 154(b) by 0 days.

(21) Appl. No.: 09/822,754

(22) Filed: Mar. 30, 2001

(65) Prior Publication Data

US 2002/0142645 A1 Oct. 3, 2002

(51) Int. Cl.[7] ............................................. H01R 11/20
(52) U.S. Cl. ...................... 439/429; 439/427; 403/320; 403/DIG. 5
(58) Field of Search ................... 439/87, 429; 403/320, 403/296, DIG. 5; 373/91, 92

(56) References Cited

U.S. PATENT DOCUMENTS

| 2,482,176 A | * | 9/1949 | Hamister | ........................ | 13/18 |
| 4,349,910 A | | 9/1982 | Belz | ........................... | 373/91 |
| 4,435,816 A | | 3/1984 | Belz et al. | .................... | 373/91 |
| 4,679,206 A | * | 7/1987 | Burwell | ...................... | 373/91 |
| 5,575,582 A | | 11/1996 | Frastaci et al. | ............. | 403/320 |

FOREIGN PATENT DOCUMENTS

| DE | 286927 | 2/1991 |
| DE | 287135 | 2/1991 |

* cited by examiner

*Primary Examiner*—P. Austin Bradley
*Assistant Examiner*—Alexander Gilman
(74) *Attorney, Agent, or Firm*—James R. Cartiglia

(57) ABSTRACT

A threaded pin for connecting carbon electrodes is presented. The pin includes a body having a central axis running along its length, two end portions, a midpoint lying between the two end portions and threads extending from the body. The threads each have at least two side walls, wherein the side wall facing the midpoint of the body of at least a plurality of the threads has an angle of between about 75° and about 90° with respect to the central axis of the body.

11 Claims, 3 Drawing Sheets

THREADED PIN FOR CARBON ELECTRODES

TECHNICAL FIELD

The present invention relates to a pin for connecting carbon electrodes, and a process for preparing the inventive pin. More particularly, the invention concerns a pin for connecting carbon electrodes, such as graphite electrodes, having a thread design and shape which can alleviate points of high mechanical stress concentration on the pin and electrode.

BACKGROUND ART

Carbon electrodes, especially graphite electrodes, are used in the steel industry to melt the metals and other ingredients used to form steel in electrothermal furnaces. The heat needed to melt metals is generated by passing current through a plurality of electrodes, usually three, and forming an arc between the electrodes and the metal. Currents in excess of 100,000 amperes are often used. The resulting high temperature melts the metals and other ingredients. Generally, the electrodes used in steel furnaces each consist of electrode columns, that is, a series of individual electrodes joined to form a single column. In this way, as electrodes are depleted during the thermal process, replacement electrodes can be joined to the column to maintain the length of the column extending into the furnace.

Generally, electrodes are joined into columns via a pin (sometimes referred to as a nipple) that functions to join the ends of adjoining electrodes. Typically, the pin takes the form of opposed male threaded sections, with at least one end of the electrodes comprising female threaded sections capable of mating with the male threaded section of the pin. Thus, when each of the opposing male threaded sections of a pin are threaded into female threaded sections in the ends of two electrodes, those electrodes become joined into an electrode column. Commonly, the joined ends of the adjoining electrodes, and the pin therebetween, are referred to in the art as a joint.

Given the extreme mechanical, electrical and thermal stresses that the joint (and indeed the electrode column as a whole) undergoes, the joint must be able to withstand such conditions and survive continuous consumption of the electrode column until it reaches the electric arc tip to be as efficient and economic as is desired. The joint must also be capable of quick and easy assembly. Due to the harshness of the environment in which the joint is expected to operate, these joints often break or degrade sufficiently (through observable cracks and/or splits) that significant amounts of graphite material are lost. As is apparent, this increases electrode consumption and decreases efficiency. It is believed that much of this degradation is caused by stresses inherent to conventional joint design, and especially points of high or concentrated stress, and the differences in material properties between the joined elements.

What is desired, therefore, is a threaded pin for connecting carbon electrodes, the pin having a shape and thread design and placement capable of alleviating or mitigating the points of high stress concentration that can cause joint failure. Especially desirable is such a pin that incorporates features that can distribute the stresses more evenly about the joint and increase the strength capability of the threaded pin.

SUMMARY OF THE INVENTION

It is an object of the present invention to provide a threaded pin for connecting carbon electrodes, the threaded pin incorporating features that can alleviate points of high stress concentration that can cause joint failure.

It is another object of the present invention to provide a threaded joint which is shaped so as to reduce high stress concentrations.

It is still another object of the present invention to provide a threaded pin having threads shaped so as to alleviate high stress concentrations.

These objects and others that will become apparent to the artisan upon review of the following description can be accomplished by providing a threaded pin for connecting carbon electrodes, where the threaded pin comprises a body having a central axis running along its length, two end portions, a midpoint lying between the two end portions and threads extending from the body, the threads each having at least two side walls. The side wall closest to the midpoint of the body of at least a plurality of the threads has an angle of between about 75° and about 90°, and more preferably at least about 85°, with respect to the central axis of the body. Indeed, a majority of the threads, and most preferably substantially all of the threads have the side wall closest to the midpoint of the body having an angle of between about 75° and about 90°, and more preferably at least about 85°, with respect to the central axis of the body.

The inventive threaded pin advantageously has a body that is generally circular in cross-section and has a channel extending therethrough from one of the end portions to the other. The channel should have a diameter of about 15% to about 55% of the diameter of the body of the pin at its midpoint, and a diameter of about 35% to about 70% of the diameter of the body of the pin at its two end portions.

Preferably, at least a plurality of the threads of the inventive pin have truncated ends. More specifically, at least a plurality of the threads located at or near at least one of the end portions of the body of the pin have truncated ends. Moreover, a line extending along the tops of the untruncated threads will advantageously have an angle of at least about 12° with respect to a line parallel to the central axis of the pin.

BRIEF DESCRIPTION OF THE DRAWINGS

The present invention will be better understood and its advantages more apparent in view of the following detailed description, especially when read with reference to the appended drawings, wherein.

DETAILED DESCRIPTION OF THE PREFERRED EMBODIMENT

Figure 1:
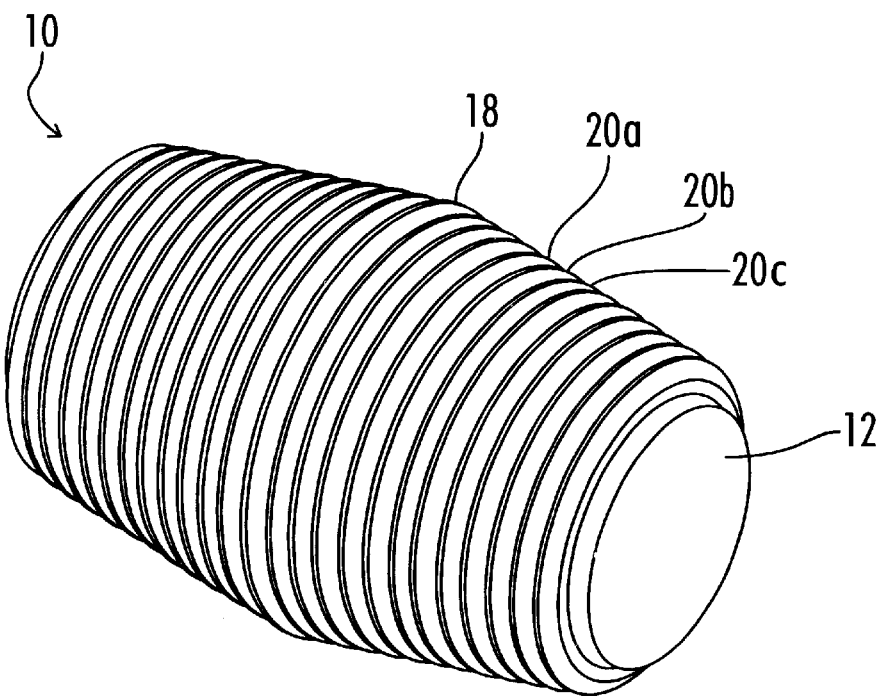
FIG. 1 is a side perspective view of a threaded pin in accordance with the present invention.
Figure 2:
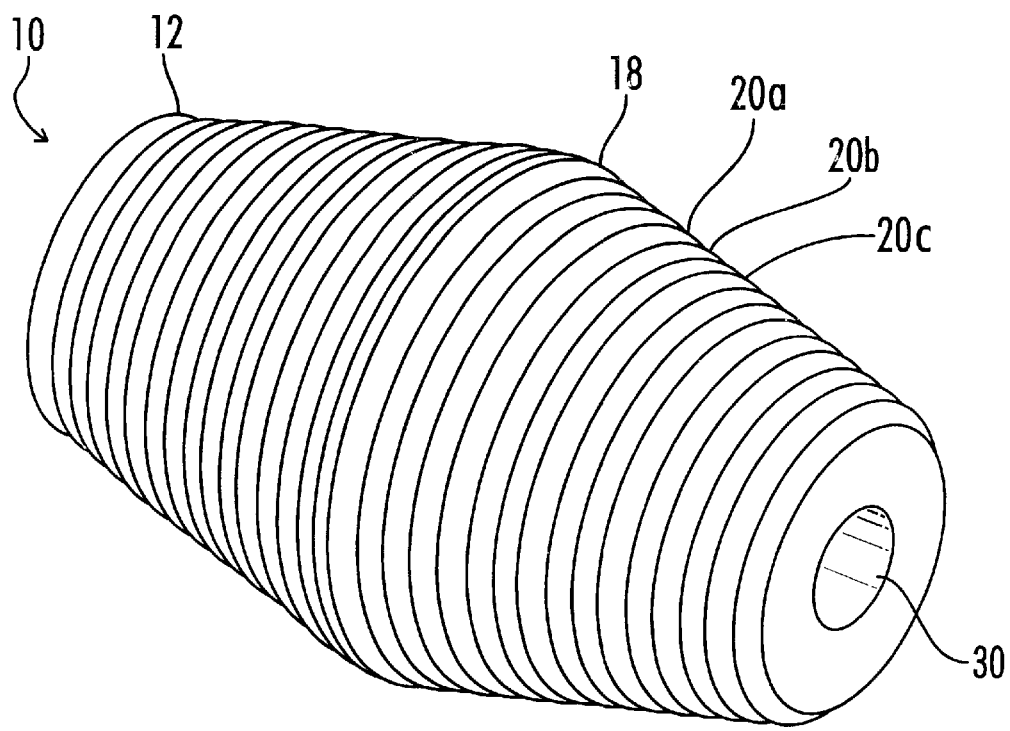
FIG. 2 is a side perspective view of another embodiment of the threaded pin of FIG. 1.

Referring to the drawings in detail, a pin for connecting carbon electrodes prepared in accordance with the present invention is shown and generally designated by the reference numeral 10. It should be noted that for the sake of clarity not all the components and elements of pin 10 may be shown and/or marked in all the drawings. Also, as used in this description, the terms "up," "down," "top," "bottom," etc. refer to pin 10 when in the orientation shown in FIGS. 4 and 5. However, the skilled artisan will understand that pin 10 can adopt any particular orientation when in use.

Pins for connecting carbon electrodes, such as graphite electrodes, can be fabricated by first combining calcined coke and pitch (as well as other desired additives) into a pinstock blend. More specifically, crushed, sized and milled calcined petroleum coke is mixed with a coal-tar pitch binder to form the blend. The particle size of the calcined coke is selected according to the end use of the electrode, and is within the skill in the art. Generally, in graphite electrodes for use in processing steel, particles up to about 25 millimeters (mm) in average diameter are employed in the blend. Other ingredients that may be incorporated into the blend at low levels include iron oxides to inhibit puffing (caused by release of sulfur from its bond with carbon inside the coke particles) and oils or other lubricants to facilitate extrusion of the blend.

After the blend of calcined coke and pitch binder, etc. is prepared, the pin body is formed (or shaped) by extrusion through a die or molded in conventional forming molds to form what is referred to as a green pinstock. The forming, whether through extrusion or molding, is conducted at a temperature close to the softening point of the pitch, usually about 1000° C. or higher. Although the die or mold can form the pin in substantially final form and size, machining of the finished pin is usually needed, at the very least to provide the threads which may be required. As would be apparent, the pins are sized so as to have a diameter no greater than that of the electrodes to be joined into an electrode column. Typically, the pins have a diameter that is about 30% to about 60% of the diameter of the electrode. Thus, for electrodes whose diameter can vary between about 380 and 750 mm, the pins have a diameter (at their widest point, or midpoint) of about 115 to about 460 mm.

After extrusion, the green pinstock is heat treated by baking at a temperature of between about 700° C. and about 1100° C., more preferably between about 800° C. and about 1000° C., to carbonize the pitch binder to solid coke, to give the pin permanency of form, high mechanical strength, good thermal conductivity, and comparatively low electrical resistance. The green pinstock is baked in the relative absence of air to avoid oxidation. Baking should be carried out at a rate of about 1° C. to about 5° C. an hour to the final temperature. After baking, the pin may be impregnated one or more times with coal tar or petroleum pitch, or other types of pitches known in the industry, to deposit additional pitch coke in any open pores of the pin. Each impregnation is then followed by an additional baking step.

After baking, the pin, referred to at this stage as carbonized pinstock, is then graphitized. Graphitization is by heat treatment at a final temperature of between about 2500° C. to about 3400° C. for a time sufficient to cause the carbon atoms in the calcined coke and pitch coke binder to transform from a poorly ordered state into the crystalline structure of graphite. Advantageously, graphitization is performed by maintaining the carbonized pinstock at a temperature of at least about 2700° C., and more advantageously at a temperature of between about 2700° C. and about 3200° C. At these high temperatures, elements other than carbon are volatilized and escape as vapors. The time required for maintenance at the graphitization temperature is generally no more than about 18 hours, indeed, no more than about 12 hours. Preferably, graphitization is for about 1.5 to about 8 hours.

As noted, once graphitization is completed, the finished pin can be cut to size and is then machined or otherwise formed into its final configuration. Typically, the pin is tapered from the middle (or midpoint) to either end, and then threads are machined into either end of the pin, to permit mating with corresponding threads in the ends of carbon electrodes, to form the electrode column. Given its nature, the graphite pin permits machining to a high degree of tolerance, thus permitting a strong connection between pin and electrode.

Figure 6:
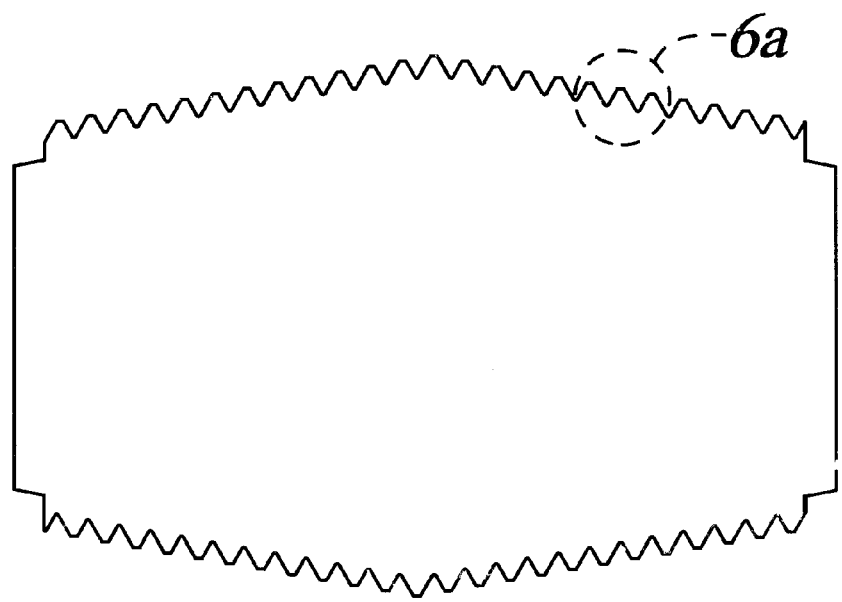
FIG. 6 is a side cross-section of a conventional threaded pin.
Figure 6A:
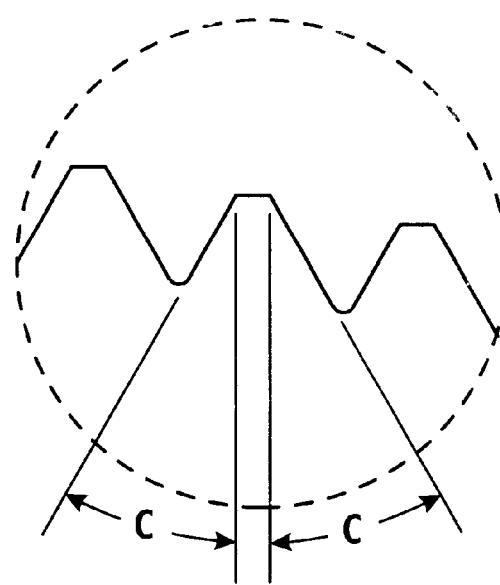
FIG. 6a is an enlarged detail view of a portion of the threads of the threaded pin of FIG. 6.

Once the pin is formed and graphitized, it is machined, as described above, to provide a final shape, threads, etc. Conventionally, the threads machined into a pin have side walls, each of which have an angle of 30° with respect to a line extending from the central axis of the pin at a 90° angle, as shown in FIGS. 6 and 6a. As also shown in those drawing figures, conventional threaded pins are tapered, such that a line extending along the tops of the threads will have an angle of less than 10° with respect to a line parallel to the central axis of the pin.

Figure 3:
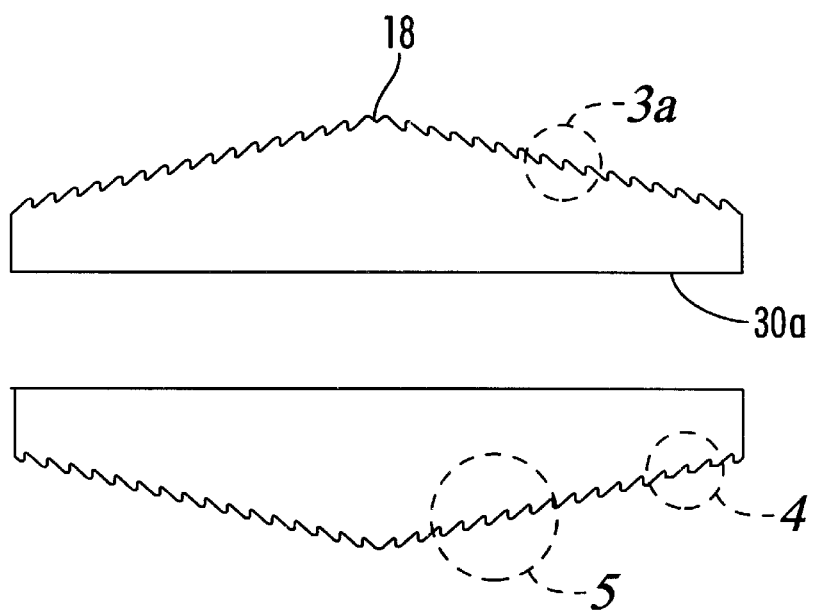
FIG. 3 is a side cross-section view of the threaded pin of FIG. 2.
Figure 3A:
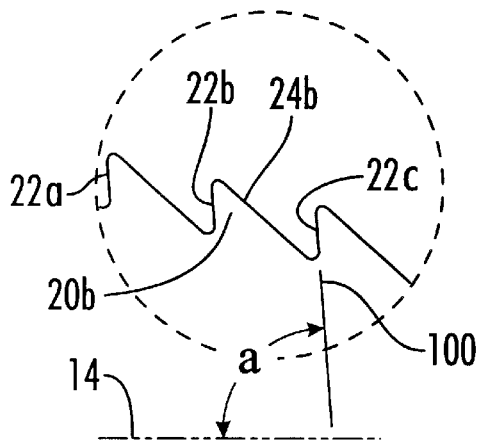
FIG. 3a is an enlarged detail view of a portion of the threads of the threaded pin of FIG. 3.

Referring now to FIGS. 1–5, it has now been found that points of high stress of the pin/electrode joint can be alleviated by providing threaded pin 10 having a body 12 which is circular in cross-section, has a central axis running along its length (as indicated by 14), two end portions 16 and 17, a midpoint 18 lying between two end portions 16 and 17 and threads 20a, 20b, 20c, etc. extending from body 12, threads 20a, 20b, 20c, etc. each having at least two side walls 22 and 24 (thus, thread 22a has side walls 22a and 24a; thread 20b has side walls 22b and 22b; thread 22c has side walls 22c and 22c, etc.). Significantly, and as illustrated in FIGS. 3 and 3a, side walls 22a, 22b, 22c, etc. facing midpoint 18 of body 12 of at least a plurality of threads 20a, 20b, 20c, etc. is generally parallel to a line (100) extending orthogonally (90°) from central axis 12 of pin 10. More particularly, side walls 22a, 22b, 22c, etc. facing midpoint 18 of body 12 of at least a plurality of threads 20a, 20b, 20c, etc., more preferably a majority, and most preferably substantially all of side walls 22a, 22b, 22c, etc. of threads 20a, 20b, 20c, etc., have an angle (a) of between about 75° and about 90° with respect to central axis 14 of body 12, more preferably an angle of at least about 85° with respect to central axis 14 of body 12.

As would be known to the artisan, the side wall 22a, 22b, 22c, etc. facing midpoint 18 of body 12 of threaded pin 10 is that side wall from which pin 10 is suspended and which bears the weight of the lower electrode 1 in an electrode joint. A horizontal thread side wall can "spread" the weight of the lower electrode more evenly about the threads, as opposed to the conventional angled threadform as shown in FIGS. 6 and 6a, where the sidewalls have less than 75° angle ("c") with respect to a line, extending orthogonally from the central axis of a pin, which creates concentrated points of high stress which can contribute to joint failure.

Another feature of pin 10 that contributes to the alleviation of points of high stress is channel 30, fonned by sidewall 30a that extends through pin 10 from one of its end portions to the other. Channel 30 can be formed by machining out the central portion of pin 10, or by other methods which would be familiar to the artisan. Advantageously, channel 30 has a diameter of about 15% to about 55% of the diameter of body 12 of pin at midpoint 12. Alternatively, channel 30 has a diameter of about 35% to about 70% of the diameter of body 12 of pin 10 at its two end portions 16 and 17. Thus, if pin 10 has a diameter at midpoint 18 of about 115 to about 460 mm, channel 30 should have a diameter between about 17 and about 255 mm. Having channel 30 can alleviate points of high stress in joint 100 by essentially acting as a "shock absorber", providing greater resilience to pin 10.

Figure 4:
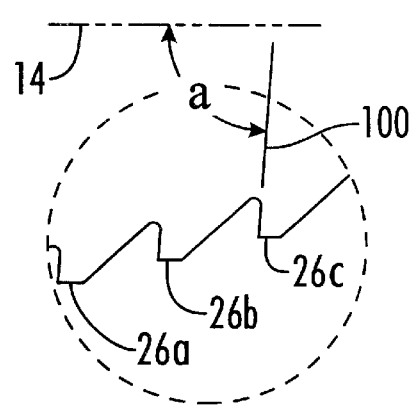
FIG. 4 is another enlarged detail of a portion of the threads of the threaded pin of FIG. 3.

Another feature of threaded pin 10 which can contribute to the alleviation of high stress points in joint 100 is truncating the ends of a plurality of threads 20a, 20b, 20c, etc., as illustrated in FIG. 4. By "truncating," is meant that the ends or points of threads 20a, 20b, 20c, etc., indicated at 26a, 26b, 26c, etc. are removed or machined off, leaving a relatively flat portion, as shown in FIG. 4. Advantageously, at least a plurality, and most advantageously most, of threads 20a, 20b, 20c, etc. located at or near at least one end portions 16 and 17 of body 12 of pin 10 have truncated ends 26a, 26b, 26c.

Figure 5:
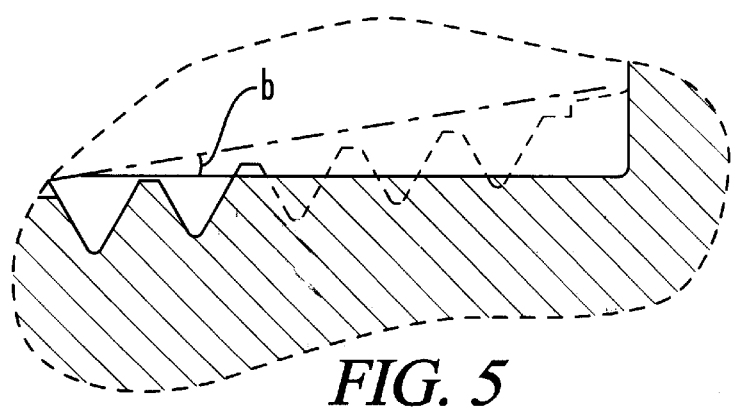
FIG. 5 is an enlarged detail view of a portion of the threaded pin of FIG. 3.

Another unique feature of threaded pin 10, is in the taper of pin 10. As noted above, conventional pins have an angle of less than 10° with respect to the central axis of the pin; indeed, 9.5° is most common. However, it has now been found that a taper angle ("b") (i.e., the angle of a line extending along the tops of the untruncated threads with respect to a line parallel to the central axis of pin 10, as illustrated in FIG. 5) of at least about 12°, and more preferably at least about 13.5° will reduce joint stress, and especially points of high joint stress.

Although the features of pin 10 described above are each individually effective at reducing areas of stress of joint 100, they can be combined to achieve further stress alleviation. Indeed, it is believed that incorporating the described threadform, channel 30, truncated threads 20a, 20b, 20c, etc. and a taper angle of at least about 12° in a single pin 10 will synergistically reduce the stress on joint 100 and create a more stable and efficient electrode column.

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. A threaded pin for connecting carbon electrodes, which comprises a body having a central axis running along its length, two end portions, a midpoint lying between the two end portions and threads extending from the body, the threads each having at least two side walls, wherein the side wall closest to the midpoint of the body of at least a plurality of the threads having an angle of between about 75° and about 90° with respect to the central axis of the body in a direction from the midpoint.

2. The threaded pin of claim 1 wherein the side wall closest to the midpoint of the body of at least a plurality of the threads having an angle of at least about 85° with respect to the central axis of the body.

3. The threaded pin of claim 2 wherein the side wall closest to the midpoint of the body of at least a majority of the threads having an angle of at least about 85° with respect to the central axis of the body.

4. The threaded pin of claim 3 wherein the side wall closest to the midpoint of the body of substantially all of the threads having an angle of at least about 85° with respect to the central axis of the body.

5. The threaded pin of claim 1 wherein the body of the pin is generally circular in cross-section and has a channel extending therethrough from one of the end portions to the other.

6. The threaded pin of claim 5 wherein the channel has a diameter of about 15% to about 55% of the diameter of the body of the pin at its midpoint.

7. The threaded pin of claim 6 wherein the channel has a diameter of about 35% to about 70% of the diameter of the body of the pin at its two end portions.

8. The threaded pin of claim 1 wherein at least a plurality of the threads have truncated ends.

9. The threaded pin of claim 8 wherein at least a plurality of the threads located at or near at least one of the end portions of the body of the pin have truncated ends.

10. The threaded pin of claim 1 wherein a line extending along the tops of the untruncated threads will have an angle of at least about 12° with respect to a line parallel to the central axis of the pin.

11. A threaded pin for connecting carbon electrodes, which comprises a body having a central axis running along its length, two end portions, a midpoint lying between the two end portions and threads extending from the body, wherein the body of the pin is generally circular in cross-section and has a channel extending therethrough from one of the end portions to the other wherein the side wall closets to the midpoint of the body of at least a plurality of the threads has an angle of between about 75° and about 90° with respect to the central axis of the body in a direction from the midpoint.

* * * * *

UNITED STATES PATENT AND TRADEMARK OFFICE
CERTIFICATE OF CORRECTION

PATENT NO.      : 6,500,022 B2
DATED           : December 31, 2002
INVENTOR(S)     : William Varela It is certified that error appears in the above-identified patent and that said Letters Patent is hereby corrected as shown below:

<u>Column 4,</u>
Line 33, "…(thus, thread 22a has…" should read as -- …(thus, thread 20a has … --
Line 34, "...side walls 22b and 33b; thread…" should read as -- ...side walls 22b and 24b; thread… --
Line 34, "...thread 22c has side" should read as -- ...thread 20c has side --
Line 35, "walls 22c and 22c, etc.)…." should read as -- walls 22c and 24, etc.)…. --
Line 60, "...channel 30, fonned by sidewall" should read as -- channel 30, formed by sidewall --
Line 66, "12 of pin at midpoint 12…" should read as -- 12 of pin 10 at midpoint 12…. --

Signed and Sealed this

Thirteenth Day of May, 2003

JAMES E. ROGAN
*Director of the United States Patent and Trademark Office*